INVENTOR.
GEORGE VASU
BY
Meyer, Baldwin, Doran & Egan
ATTORNEYS

United States Patent Office 3,250,898
Patented May 10, 1966

3,250,898
MULTIPLIER TYPE GAIN COMPUTER
AND CONTROL SYSTEM
George Vasu, 37825 Lorie Blvd., Avon, Ohio
Filed Oct. 5, 1961, Ser. No. 143,120
12 Claims. (Cl. 235—151)

This invention relates to self adapted control systems and more particularly to the employment of multiplier type gain computation for correction of the system operation.

A primary object of the present invention is to provide multiplier type gain computers of general application.

Another object of the present invention is to provide a multiplier type gain computer capable of measuring system gain from signals of various configurations.

Other objects and advantages of the multiplier type gain computer and control system for use therewith will be apparent to one skilled in the art to which it pertains and upon reference to the following disclosure of several preferred embodiments defining the concepts thereof and which are illustrated in the accompanying drawings wherein.

Briefly, control systems are being continually called upon to perform an ever increasing number of tasks which are oftentimes very complex in nature whereby said systems are required to perform over an ever-increasing range of conditions and with a substantial reliability that said control will be positive in nature over the desired range of operation.

One of the major sources of difficulty in achieving satisfactory control system behavior has been the inability to account satisfactorily for variations in characteristics of components used in said systems whereby variations result from the use of said components whereby the operation thereof may become unpredictable.

In most cases, adjustments in controls to compensate for variation in the components of said system are made according to previous calibrations of the system, and the adjustments made are scheduled in accordance with a predetermined parameter related to the variation.

It is therefore desirable to afford means to monitor dynamic performance parameters of a system whereby corrections and variations in the performance of the system may be readily determined.

The multiplier type gain computer of the present invention is intended to provide for the monitoring and resultant determination of the gain parameter of a control system which computed gain parameter may be compared with appropriate reference signals of the said system to generate error signals which may then be utilized to control the dynamic performance of the said system.

*List of symbols*

C—control
E—error
F—filter
G—general system component
H—feedback component
I—input
K—gain
L—D.C. level filter
O—output
P—plant
S—servo s—Laplacian operator
t—time
x—general signal
$\bar{x}$—general signal with D.C. level removed
$x(s)$—Laplace transform of $x(t)$
$x(t)$—general time function
y—general signal
$\bar{y}$—general signal with D.C. level removed
Subscripts:
   f—filtered signal
   m—measured value
   s—set value The above list of symbols identify the components, operational characteristics and the relationship therebetween of the systems of the present invention now to be described.

Figure 1:
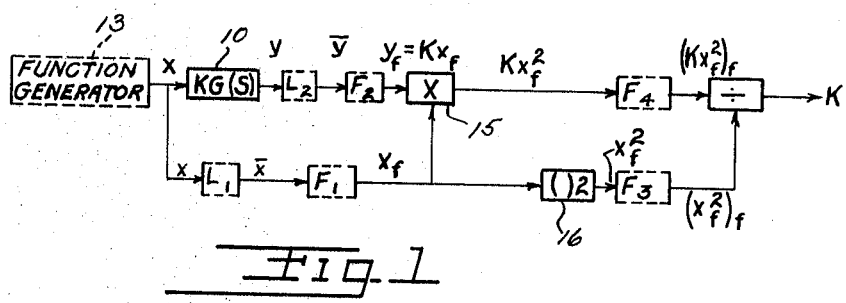
FIG. 1 is a block diagram of a multiplier type gain computer embodying the present invention.

With reference now directed to FIG. 1 of the drawings, a multiplier type gain computer embodying the concepts of the present invention is herein shown especially adapted to measure system gain automatically and either continuously or intermittently with either analog or digital devices.

It is assumed that the measurement of gain is desired for a system 10, the transfer function of which is KG(s), where K represents the gain of the said system, and G(s) represents the dynamic function of a general system component or group of components, (s) being the Laplacian operator. The computer is adapted for the general condition where signals including those not sinusoidal in configuration may be readily utilized.

Signals suitable for gain computation may be obtained by utilizing a test signal $x$ generated by function generator 13.

The input signal $x$ applied to the input of the system 10 disturbs said system so as to generate an output signal $y$.

The input signal $x$ of the said system and the output signal $y$ are each connected to the input of filter components, the output signals of the latter being identified as $x_f$ and $y_f$.

The filtered output signal $y_f$ of the system 10 is intended to equal the gain of the said system times the filtered input signal $x_f$ of the said sysem.

This may be accomplished in several ways.

Signal $y_f$ can be made equal to $Kx_f$ in several ways. Filters $F_1$ and $F_2$ can shape and phase the signals $x$ and $y$ as discussed below. Or, the input $x$ can be selected to include only frequencies for which the dynamics are negligible. Or, combination methods of selection and filtering can be employed. The purpose of each method is to provide a signal $y_f$ to the multiplier that is K times $x_f$.

In most cases, a measure of the slope K of the static characteristic is desired, not simply the output divided by the input. For these cases, the static or D.-C. levels of $x$ and $y$ must be removed. Components $L_1$ and $L_2$ are inserted to perform this function; $L_1$ and $L_2$ can consist simply of identical filters that remove low frequencies but do not affect other frequencies. The operation performed by filters $L_1$ and $L_2$ could have been included in $F_1$ and $F_2$. To simplify the discussion that follows, however, $L_1$ and $L_2$ are indicated as separate blocks. In case the ratio of the total output to the total input is desired, filters $L_1$ and $L_2$ are of course not required.

Removal of the levels $x$ and $y$ thus provides deviation signals $\bar{x}$ and $\bar{y}$; $\bar{x}$ and $\bar{y}$ are then filtered in one of several fashions to provide signals $x_f$ and $y_f$.

*Complete compensation.*—A straightforward method of filtering is to design filters $F_1$ and $F_2$ so that $$F_1(s) = G(s)F_2(s) \tag{1}$$

Since
$$x_f(s) = F_1(s)\bar{x}(s) \quad (2)$$
where $x_f$ is the filtered input signal
$\bar{x}$ is the input signal with the D.C. level removed, and
$$y_f(s) = F_2(s)\bar{y}(s) \quad (3)$$

$y_f$ is the filtered output signal
$\bar{y}$ is the output signal with the D.C. level removed and since
$$\bar{y}(s) = KG(s)\bar{x}(s) \quad (4)$$
where K is the gain of the system we obtain by substituting (2) and (3) in (4),
$$\frac{y_f(s)}{F_2(s)} = KG(s)\frac{x_f(s)}{F_1(s)} \quad (5)$$
or
$$y_f(s) = \frac{KG(s)F_2(s)}{F_1(s)}x_f(s) \quad (6)$$

Substituting from Equation 1, Equation 6 becomes
$$y_f(s) = Kx_f(s) \quad (7)$$
or
$$y_f(t) = Kx_f(t) \quad (8)$$

Since the proper dynamic relationship of $y_f$ to $x_f$ is established for a wide range of frequencies, the signals at $x$ and $y$ chosen for computation of the gain can be of a general transient nature. They need not be purely sinusoidal. This advantage is achieved in this case by matching $F_1(s)$ to $G(s)F_2(s)$. The disadvantage of this method of matching is that a prior knowledge of the normalized transfer function $G(s)$ is required. Furthermore, a precise value of computed gain depends upon $G(s)$ remaining constant or the filters varying according to the relation $F_1(s)/F_2(s) = G(s)$.

The requirement that $F_1(s)/F_2(s) = G(s)$ or
$$F_1(s) = F(s)F_2(s)$$
implies that compensation for the dynamics of $G(s)$ can be accomplished partially in $F_1$ and partially in $F_2$. In most cases, it is simpler either to design $F_1(s) = G(s)$ and omit $F_2$ or to design $F_2(s) = 1/G(s)$ and omit $F_1$. The final choice of filtering will depend upon the type of system given, the general sequence of events within a given system, and the relative amount and frequencies of noise present.

The requirement that $F_1(s)/F_2(s) = G(s)$ does not imply that signals must be passed throughout the normal response range of $G(s)$. In fact, the band of signals utilized in computing the gain can be selected to satisfy other requirements. Thus, the form of the functions $F_1(s)$ and $F_2(s)$ can vary widely, the only stipulation being that the ratio $F_1(s)/F_2(s) = G(s)$.

*Partial compensation.*—In the first approach
$$[F_1(s) = G(s)F_2(s) \text{ or } F_1(s)/F_2(s) = G(s)]$$
it was specified that $F_1(s)$ and/or $F_2(s)$ should compensate completely for the dynamics of the system function $G(s)$.

A compromise approach is also feasible. In this approach, assume that it is desirable to eliminate a portion of the system response. It may be beneficial to eliminate a portion of the response for several reasons. For example, the form of the function $G(s)$ may be such that it will be difficult to compensate for certain portions of the response. Also, a portion of the system function $G(s)$ may vary. Or it may be preferable to operate in a given region for other reasons, such as to obtain a better response in the gain computer or to permit operation in regions of lower noise level.

In this compromise approach, $F_1$ and $F_2$ are designed to pass signals only in the selected range and to attenuate signals in the region of the system frequency response which is variable or otherwise undesirable. The system function $G(s)$ can thus be separated into two parts $G_1(s)$ and $G_2(s)$ such that
$$G(s) = G_1(s) + G_2(s) \quad (10)$$
where
$$G(s) = G_1(s) \quad (11)$$
in the pass band of $F_1$ and $F_2$ and
$$G(s) = G_2(s) \quad (12)$$
outside the pass band of $F_1$ and $F_2$.

The procedure then is to design $F_1(s) = G(s)F_2(s)$ within the pass band. Hence
$$F_1(s) = G_1(s)F_2(s) \quad (13)$$
and, in the pass band
$$\bar{y}(s) = KG_1(s)\bar{x}(s) \quad (14)$$
and since
$$x_f(s) = F_1(s)\bar{x}(s) \quad (15)$$
and
$$y_f(s) = F_2(s)\bar{y}(s) \quad (16)$$

Equation 14 becomes
$$\frac{y_f(s)}{F_2(s)} = \frac{KG_1(s)}{F_1(s)}x_f(s) \quad (17)$$
or
$$y_f(s) = Kx_f(s) \quad (18)$$
from which
$$y_f(t) = Kx_f(t) \quad (19)$$

A contrasting approach in the selection of the filters $F_1$ and $F_2$ is to design the same so that they are identical and thus capable of passing signals in a range of frequencies for which the dynamics of the system 10 are negligible, and which attenuate all other frequencies.

For example, assuming that
$$F_1(s) = F_2(s) \quad (21)$$
and in the pass band
$$\bar{y}(s) = K\bar{x}(s) \quad (22)$$
and since
$$x_f(s) = F_1(s)\bar{x}(s) \quad (23)$$
and
$$y_f(s) = F_2(s)\bar{y}(s) \quad (24)$$
Equation 22 becomes
$$\frac{y_f(s)}{F_2(s)} = \frac{Kx_f(s)}{F_1(s)} \quad (25)$$
or
$$y_f(s) = Kx_f(s) \quad (26)$$
from which
$$y_f(t) = Kx_f(t) \quad (27)$$

As will also be realized, when the dynamics of the system under observation are substantially negligible, the requirement that $F_1(s) = F_2(s)$ can, if desired, be reduced to $F_1(s) = F_2(s) = 1$. This indicates that when the system transfer function is K, no filtering in $F_1$ and $F_2$ is required and hence these filters can be eliminated.

The extent to which system dynamics influence gain computation is of course dependent upon the specific application of the said system. In certain applications it may be entirely practical to obtain satisfactory gain signals without using filters even with input signals to the system being distorted by the system dynamics.

With the proper selection of the filters $F_1$ and $F_2$ in the manner just described, the filtered output signal of the system 10 or $y_f$ is then equal to the gain of the system K times the filtered input signal $x_f$.

A further description and derivation of the filter components may be obtained from my conference paper entitled "Self-Adaptive Systems for Automatic Control of Dynamic Performance by Controlling Gain, Phase Shift, Gain Margin, Phase Margin, or Slope," presented to the 1960 Fall General Meeting of the American Institute of Electrical Engineers.

The filtered output signal of the system $y_f$ after passing through filter units $L_1$, $L_2$, $F_1$, $F_2$ is then multiplied in multiplier 15 by the filtered input signal of the said system $x_f$ to thereby result in a multiplied output signal equal to $Kx_f^2$.

The filtered input signal $x_f$ in the said computer system is then squared in squarer circuit 16 to provide an output signal from the latter equal to $x_f^2$.

The multiplier output $Kx_f^2$ may then be divided by the squarer output signal $x_f^2$ or these signals each may be passed through suitable filters $F_4$ and $F_3$ whereafter the same are applied to a divider circuit which division results in an output signal equal to K, the gain of the system 10.

The multiplying, squaring and dividing circuits are conventional circuits or function generators and do not constitute a part of the present invention and therefore need not be described in detail.

Figure 2:
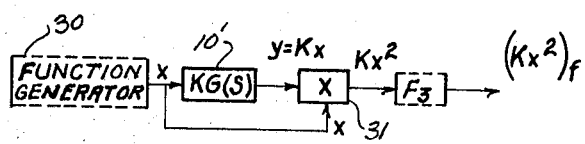
FIG. 2 is a block diagram of a simplified version of the multiplier type gain computer shown in FIG. 1; and, FIG. 3 is a block diagram of a control system utilizing the multiplier type gain computer embodying the present invention.

If the characteristics of the input signal $x$ are known and the conditions of the system are such that $y=K$ times $x$, the computer of FIG. 1 may be further simplified to that as is shown in FIG. 2 wherein it is illustrated a function generator 30 which generates the aforementioned signal $x$ as the input to the system 10', the transfer function of the latter being $KG(s)$. The output signal $y$ of the system 10' equalling K times $x$ is seen to be multiplied by multiplier 31 by the signal $x$ to thus provide an output signal $Kx^2$ which may be passed through a suitable filter $F_3$ the output of which $(Kx_f^2)$ being the filtered output being likewise a direct indication of the gain of the system 10'.

Figure 3:
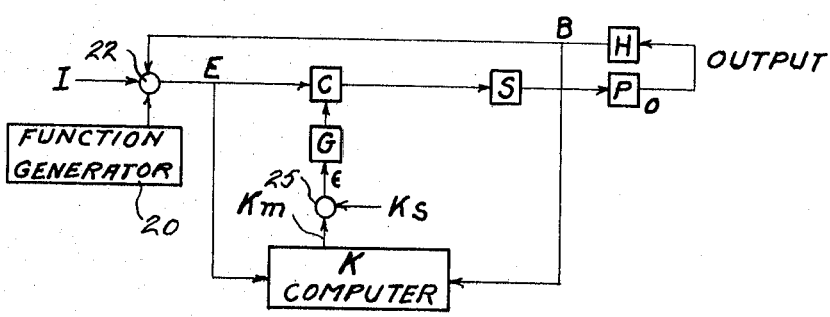

The general arrangement of a system that provides automatic control of gain utilizing the computer of FIG. 1 is illustrated in FIG. 3.

FIG. 3 represents a single closed loop system consisting of a main controller C, a servo S, and the plant P to be operated with a feed back device H connected to the output of said plant P.

A function generator 20 generates an input signal to an adder 22, the latter also receiving an input signal I and the feed back signal from the feed back unit H, said additive signals resulting in an error signal E.

The error signal E and feed back signal B are sensed by the gain computer of the type shown in FIG. 1 and assuming that it is desired to control, for example, the loop gain of the control system, said signals are sensed and computed by the gain computer the latter resulting in generating an output signal which represents a measured value of gain $K_m$.

The measured gain $K_m$ of the computer is then compared with a desired or known signal $K_s$ in comparator 25 which compares and produces a gain error signal $\epsilon$.

This error signal $\epsilon$ is then applied to the input of a gain controller G which varies the main controller C causing a variance in the gain within the said main controller as is required to satisfy the error signal $\epsilon$.

As will now be apparent, the gain of any component or group of components in a system may be measured, and the correction signal may be used to vary said gain. Also, the correction signal might be generated either from the error signal $\epsilon$ or by scheduling as a function of the measured gain as will be understood. For example, the plant gain could be measured and a correction to the main controller gain could be scheduled as a function of the measured gain. Furthermore, it may be desirable to control the gain of more than one part of a system.

What is claimed is:

1. A gain computer for a system comprising means for supplying an input signal to the input of said system, means for multiplying the output signal of said system by said input signal, means for squaring the input signal to said system, and means for dividing said multiplied signals by said squared signal to produce a signal representing the gain of said system.

2. A gain computer as is defined in claim 1 and wherein filter means are interposed between the output of said system and the multiplying means.

3. A gain computer as is defined in claim 1 and wherein filter means are interposed between the input of said system and the multiplying means.

4. A gain computer for a system comprising in combination means for supplying a signal to the input of said system, means for multiplying the output signal of said system by said input signal, filter means interposed between the output of said system and said multiplier means and the input of said system and said multiplier means, means for squaring the filtered input signal and means for dividing the multiplied signals by said squared signal to produce a signal representing the gain of said system.

5. A gain computer as is defined in claim 4 and including filter means interposed between the output of the multiplier means and the dividing means.

6. A gain computer as is defined in claim 4 and including filter means interposed between the output of the squaring means and said multiplier means.

7. A gain computer for a system comprising in combination means for supplying a signal to the input of said system, means for multiplying the output signal of said system by said input signal, filter means interposed between the output of said system and said multiplier means and the input of said system and said multiplier means, means for squaring the filtered input signal, means for dividing the multiplied signals by said squared signal to produce a signal representing the gain of said system, filter means interposed between the output of the multiplier means and said divider means, and filter means interposed between the output of the squaring means and said divider means.

8. A gain computer for a system having an input and an output signal, means for multiplying the output signal of said system by said input signal, means for squaring the input signal to said system, and means for dividing said multiplied signals by said squared signal to produce a signal representing the gain of said system.

9. A gain computer for a system having input and output signals comprising in combination means for supplying a signal to the input of said system, filter means for removing the D.C. component of the output signal of said system to define a deviation output signal, filter means for removing the D.C. component of the input signal to define a deviation input signal, filter means for filtering the output and input deviation signals, means for multiplying the filtered input deviation signal by the filtered output deviation signal, means for filtering the multiplied signal, means for squaring the filtered input deviation signal, means for filtering the squared signal, and dividing means for dividing the filtered multiplied signal by the filtered squared signal to produce a signal representing gain of the system.

10. A gain computer for a system comprising in combination means for supplying a signal having at least two signal components of different frequencies and magnitude to the input of said system, said system having a transfer function equal to $KG(s)$ and providing an undelayed output signal including undelayed input signal components of different frequencies, means for multiplying the undelayed output of said system by the undelayed input signal.

11. A gain computer for a system comprising in combination means for supplying a signal having at least two signal components of different frequencies and magnitude to the input of said system, said system having a transfer function equal to $KG(s)$ and providing an undelayed output signal including undelayed signal components of different frequencies, means for multiplying the undelayed output of said system by the undelayed input signal, and means for filtering said multiplied signal to produce a signal having a component representing the gain of the system.

12. An automatic condition control arrangement for gain in a control system which is designed for maintenance of a gain relationship between two points in the system, which points are referred to as the feedback signal point and the error signal point, which comprises the combination of means for directing signals of a predetermined frequency to the error signal point, an adjustable controller having an input connection and responsive to input signal thereto for adjustment of the system gain in response to variations in input signals to the adjustable controller, computer means responsive to gain between the feedback point and the error point, said computer means having input connections from said points and an output connection, a comparator having an input connection from said computer means and a second input connection and an output connection, means for supplying a set value of the gain relationship to be maintained to said comparator second input connection, said output connection being applied to the input connection of the gain controller.

References Cited by the Examiner

UNITED STATES PATENTS

| | | | |
|---|---|---|---|
| 2,854,191 | 9/1958 | Raisbeck | 235—181 |
| 2,902,644 | 9/1959 | McDonald | 324—77 XR |
| 2,907,950 | 10/1959 | Raisbeck | 324—57 |
| 2,932,471 | 4/1960 | Exner et al. | 235—151 XR |
| 3,013,721 | 12/1961 | Roster et al. | 235—151 |

OTHER REFERENCES

Chelustkin, "The Design and Application of Correlation Control," Automatic Control, pages 16 to 20, May 1958.

MALCOLM A. MORRISON, *Primary Examiner.*

DARYL W. COOK, *Examiner.*